United States Patent
Myers

[11] 3,720,284
[45] March 13, 1973

[54] THEFT-PREVENTION IGNITION SYSTEM

[76] Inventor: Philip Myers, 18 de Julio, Moutevideo, Uruguay

[22] Filed: Oct. 26, 1970

[21] Appl. No.: 84,506

[52] U.S. Cl. ....................180/114, 70/239, 70/242, 123/148 S, 123/198 DC, 200/42 R, 307/10 AT, 340/64
[51] Int. Cl. .......B60r 25/04, B60r 25/08, B60r 25/10
[58] Field of Search .....180/114; 307/10 AT; 340/63, 340/64; 123/148 S, 198 DC; 70/238, 239; 200/42 R, 19 L

[56] References Cited

UNITED STATES PATENTS

| | | | |
|---|---|---|---|
| 2,130,303 | 9/1938 | Huss | 340/64 X |
| 2,583,752 | 1/1952 | Smith | 340/64 |
| 3,194,970 | 7/1965 | Claps | 340/64 X |
| 3,174,502 | 3/1965 | Howarth et al. | 180/114 UX |
| 2,517,619 | 8/1950 | Ainley | 340/63 |
| 2,000,136 | 5/1935 | Huss | 340/64 |
| 1,396,667 | 11/1921 | Simms | 340/64 |
| 3,464,060 | 8/1969 | Arditti | 340/64 |
| 3,453,591 | 7/1969 | Perez | 340/64 |
| 2,205,104 | 6/1940 | Hay | 340/64 |
| 2,515,044 | 7/1950 | Kappel | 180/114 X |

FOREIGN PATENTS OR APPLICATIONS

| | | | |
|---|---|---|---|
| 15,156 | 10/1966 | Colombia | |
| 582,480 | 7/1933 | Germany | 180/114 |

*Primary Examiner*—Benjamin Hersh
*Assistant Examiner*—John P. Silverstrim
*Attorney*—Finnegan, Henderson & Farabow

[57] ABSTRACT

A theft-prevention ignition system having a plurality of normally open switches selectively located throughout a conventional ignition system and a plurality of normally closed switches located throughout the system whereby the vehicle is disabled. A multi-contact switch assembly contains the normally open and normally closed switches and includes a mobile electrically insulating plate which must be inserted into the switch assembly to permit operation of the vehicle.

14 Claims, 5 Drawing Figures

INVENTOR
PHILIP MYERS

BY Finnegan, Henderson & Farabow
ATTORNEYS

INVENTOR
PHILIP MYERS

BY *Finnegan, Henderson & Farabow*
ATTORNEYS

INVENTOR
PHILIP MYERS

BY *Finnegan, Henderson & Farabow*
ATTORNEYS

THEFT-PREVENTION IGNITION SYSTEM

This invention relates to a theft-prevention system for vehicles and more particularly to a theft-prevention ignition system.

Numerous systems are known for protecting vehicles against theft. For example, alarm systems have been provided which sound the vehicle's horn to warn of an attempted theft. Devices have also been provided to lock the vehicle's steering system. The flow of current from the battery to the primary coil in the ignition system has been prevented in other systems, such as that described in Colombian patent certificate number 15,156 registered Oct. 3, 1966. Although these devices have served the purpose, they have not proved entirely satisfactory under all conditions of service. For example, the horn-alarm that activates the horn upon light pressure being applied to the vehicle's body has not proved to be successful because the horn is so frequently sounded that it is soon ignored. Furthermore, it is a simple matter to disconnect the alarm by cutting one of the conductors of the horn without disabling the rest of the vehicle's electrical system.

Combined systems of the horn-alarm and ignition interrupters have also been found to be less than satisfactory under some conditions. These combined systems have proved to be very complicated and expensive in manufacture and installation. Furthermore, they have proved to be inconvenient in operation because they require several control points to activate the respective relays and coils present in the system.

Other systems have been provided for controlling the flow of current to the spark plugs in the vehicle's motor; however, thieves have quickly learned how to overcome these systems.

It is, therefore, an object of the present invention to provide a theft-prevention ignition system which effectively disables the vehicle and which is extremely difficult to compromise.

Another object is to provide a theft-prevention ignition system for vehicles which is simple in construction and which utilizes the primary coil of the conventional ignition system as the fundamental element of security.

Additional objects and advantages of the invention will be set forth in part in the description which follows, and in part, will be obvious from the description, or may be learned by practice of the invention. The objects and advantages are realized and obtained by means of the instrumentalities and combinations particularly pointed out in the appended claims.

To achieve these objects, the present invention, as embodied and broadly described, provides a theft-prevention ignition system for vehicles having a D.C. energy source, a primary coil, an ignition switch in circuit with the source and the coil, breaker points connected between the coil and electrical common, a capacitor in parallel circuit with the breaker points, a cam located to make and break the breaker points, a secondary coil electromagnetically coupled with the primary coil and a distributor in circuit with the secondary coil wherein the improvement comprises a first normally open switch in circuit with the primary coil and the breaker points for preventing the flow of current to the points and the capacitor when the ignition switch is closed; a second normally closed switch in circuit with the primary coil; a third normally open switch; and warning means in circuit with the second and third switches for continuously producing a warning signal when the second switch is closed if the third switch is even momentarily closed whereby the continuous presence of the warning signal will place persons in the vicinity on notice that the vehicle is being tampered with.

Preferably, the warning means include a first relay in circuit with the second switch and coupled to the third switch to be grounded to electrical common through the third switch when the third switch is closed; a second relay in circuit with the first relay and in parallel circuit with the third switch for grounding the first relay to common even when the third switch is open; and a warning device in circuit with the first and second relays.

Additionally, it is preferred that the first relay include terminals in circuit with the second switch and the warning device for enabling the activation of the warning device when the terminals are closed and the second switch is closed. The second relay preferably includes terminals in circuit with the first relay and electrical common to enable the grounding of the first relay to common when the last-mentioned terminals are closed.

Preferably, the system further includes a fourth normally closed switch in circuit with the primary winding; a first solenoid in circuit with the fourth switch; and brake means coupled to the solenoid for braking the vehicle when the fourth switch is closed and a circuit is completed from the D.C. energy source through the fourth switch as by a thief tampering with the system.

A fifth normally closed switch is also preferably provided in circuit with the primary coil and the breaker points for normally grounding the primary coil to prevent current from passing to the breaker points whereby the vehicle's engine cannot be started. A sixth normally open switch is also preferably provided in circuit with the primary winding and a second solenoid is provided in circuit with the sixth switch. Exhaust blocking means are preferably coupled to the second solenoid for blocking the engine exhaust of the vehicle to stall the vehicle when the sixth switch is open and the engine is started.

The switches are preferably located in a multi-contact switch assembly having a first fixed electrically insulating plate with a plurality of conductor elements therein; a second fixed electrically insulating plate having a plurality of conductor elements therein and in opposed position with the first plate conductor elements; first predetermined opposing ones of the conductor elements being spring loaded to normally physically contact each other and to form normally closed electrical switches; second predetermined opposing ones of the conductor elements being oriented in the respective insulating plates to be physically separated and electrically isolated from each other to form normally open electrical switches; and a mobile electrically insulating plate having conductor elements therein for conductively contacting the opposed normally open elements of the fixed plates when the mobile plate is selectively inserted between the first and second plates to close the open switches; the mobile plate further having electrically insulating areas therein for electrically and physically separating the normally closed elements when the mobile plate is selectively inserted between the first and second plates to open the closed switches.

It is to be understood that both the foregoing general description and the following detailed description are exemplary and explanatory and are not restrictive of the invention.

The accompanying drawings which are incorporated in and constitute a part of this specification, illustrate preferred embodiments of the invention and, together with the description, serve to explain the principles of the invention.

IN THE DRAWINGS

Figure 1:
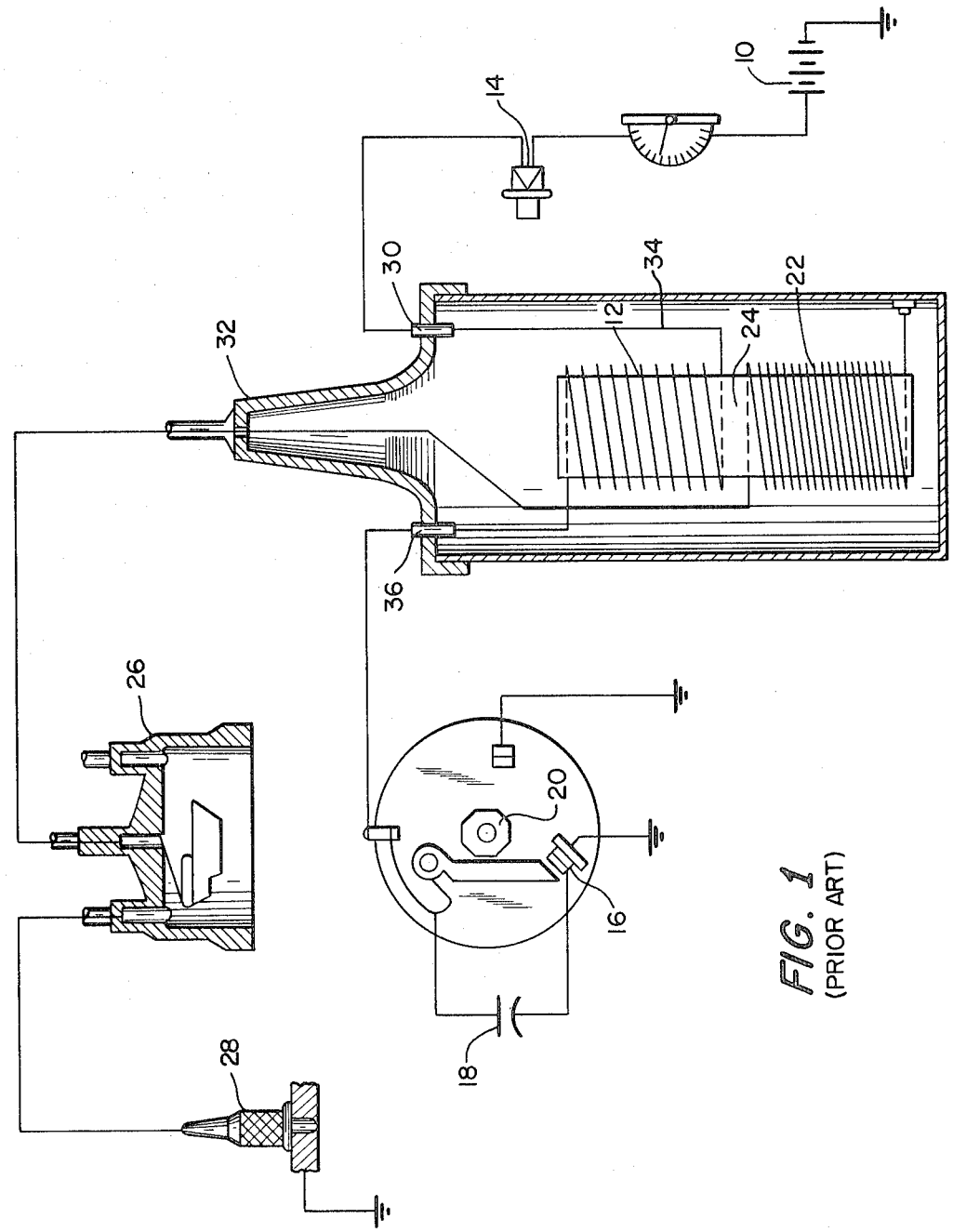
FIG. 1 is a diagrammatic illustration of a conventional ignition system.

With reference now to the drawings, wherein like reference characters designate like or corresponding parts throughout the several views, there is shown in FIG. 1 a conventional electrical ignition system which includes a D.C. energy source or battery 10, a primary coil 12 and an ignition switch 14 in circuit with the battery and the primary coil.

Breaker points 16 are connected between the primary coil and electrical common or ground, and a capacitor 18 is located in parallel circuit with the breaker points. A cam 20 is located to make and break the breaker points, and a secondary coil 22 is electromagnetically coupled with the primary coil by a magnetic core 24. Distributor 26 is located in circuit with secondary coil 22 to provide the necessary electrical energy to spark plugs 28.

The operation of this conventional ignition system is well known. Current is supplied by battery 10 through ignition switch 14 and through terminal 30 located in cover 32. The current passes through conductor 34 and through primary coil 12 to terminal 36. From here the current flows through breaker points 16 to ground.

The current in primary winding 12 induces a magnetic field in and around core 24. Thus, when breaker points 16 are opened by the cam 20, the current that had been flowing through the points flows into capacitor 18. The capacitor then becomes charged and the current through primary coil 12 rapidly falls to result in the collapse of the magnetic field in and around core 24.

Secondary winding 22 consists of many turns of fine wire wound on core 24 together with primary winding 12. The rapid collapse of the magnetic field causes a high voltage to be induced in secondary winding 22, and this voltage passes through distributor 26 and ultimately to spark plugs 28 to ignite the fuel mixture within the individual cylinders of the engine (not shown).

Figure 2:
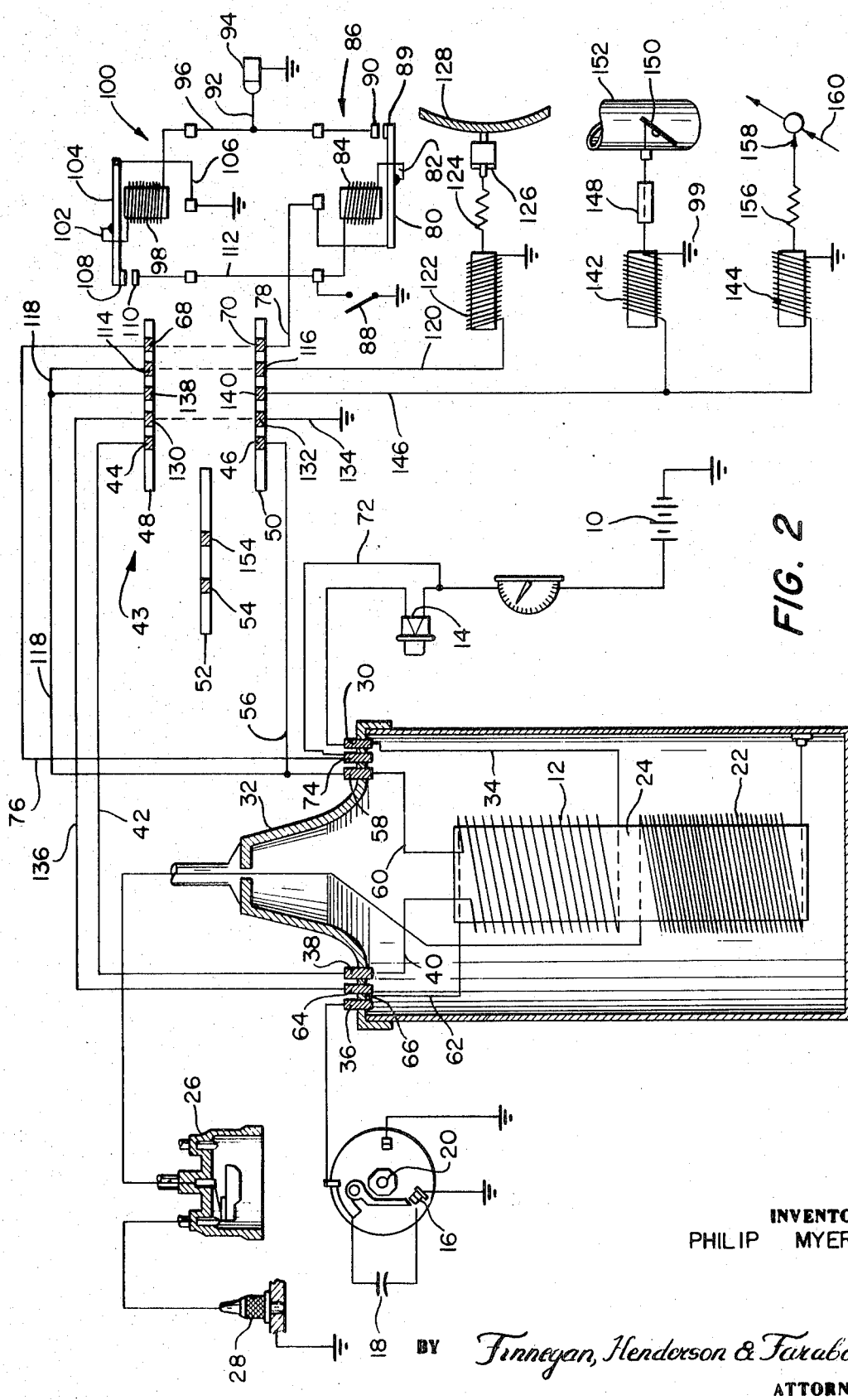
FIG. 2 is a diagrammatic illustration of preferred embodiments of the invention.

With reference now to FIG. 2, there is shown the conventional ignition system of FIG. 1 with the addition of some of the preferred theft-prevention features of this invention.

An electrical terminal 38 is located within cover 32 and is connected to primary coil 12 via line 40. Terminal 38 is also connected by line 42 to a first normally open switch having opposed conductor elements 44 and 46, respectively, located in fixed electrically insulating plates 48 and 50.

A switch assembly is provided that preferably includes a mobile electrically insulating plate 52 which includes a conductor element 54 therein for selectively contacting the opposed conductor elements 44 and 46 when plate 52 is inserted between fixed plates 44 and 46.

Each of the fixed plates 48 and 50 includes a plurality of conductor elements in opposed positions with respect to each other, and mobile plate 52 preferably includes a plurality of conductor elements and a plurality of insulating areas for insertion between respective ones of the conductor elements of the fixed plates. The location and operation of these conductor elements and insulating areas will be discussed in more detail later in this specification.

Conductor element 46 is connected by line 56 to terminal 58 located in cover 32. Line 60 then connects terminal 58 to primary coil 12, and conductor 62 couples the primary coil to terminals 36 and 64, which are electrically coupled by bridge 66. Terminal 36 is coupled to breaker points 16 and to capacitor 18 in the same manner as illustrated in the conventional system of FIG. 1. Thus, the primary winding has been modified, and additional terminals have been added to cover 32.

In operation, the interruption between conductor elements 44 and 46 in switch assembly 43 prevents the flow of current from the primary coil to breaker points 16 and to capacitor 18. Thus, capacitor 18 is not charged and the opening and closing of breaker points 16 produces no change in magnetic field surrounding core 24. As a result, no voltage is induced in secondary winding 22 to provide energy to distributor 26 and to spark plugs 28.

When mobile plate 52 is inserted between fixed plates 48 and 50, conductor element 54 is positioned between and contacts conductor elements 44 and 46 to complete the circuit through primary coil 12. With this circuit completed, the opening and closing of breaker points 16 results in the charging and discharging of capacitor 18 with concomitant changes in the electromagnetic field surrounding core 24. A large voltage is, thus, induced in the secondary winding to provide energy to distributor 26 and to spark plugs 28.

If someone attempting to energize the ignition system without the use of mobile plate 52 establishes a bridge between battery 10 or terminal 30 and terminal 58, current will flow to capacitor 18 and breaker points 16. However, because of the interruption in primary winding 12 caused by normally open conductor elements 44 and 46, current does not flow through the primary winding and no voltage is induced in the secondary winding to provide energy to the spark plugs. The same results would occur if terminals 30 and 36 were bridged. Thus, it is very difficult to compromise this portion of the system without the use of mobile plate 52.

In accordance with this invention, a second normally closed switch is provided in circuit with the primary coil. As here embodied, the second switch includes conductor elements 68 and 70 located in fixed plates 48 and 50, respectively. Battery 10 is connected by line 72 to terminal 74 located in cover 32. Conductor 76, in turn, couples terminal 74 to conductor element 68 in switch assembly 43.

Opposing conductor element 70 is coupled through line 78 to first relay plate 80. This plate is normally in the position illustrated in FIG. 2 and is in contact with terminal 82, which is coupled to coil 84 of first relay 86. A third switch 88, which may be a switch coupled to the hood of an automobile, is normally open as when the hood of the vehicle is closed, and is located between electrical common or ground and first relay coil 84.

Relay plate 80 includes terminal 89 for contacting terminal 90, and terminal 90 is coupled via line 92 to a warning device 94, such as a horn.

Terminal 90 is also connected via conductor 96 to second relay coil 98 of second relay 100, and terminal 102 normally contacts second relay plate 104, which is grounded by conductor 106. The second relay plate includes a terminal 108 for selectively contacting terminal 110, which is coupled via line 112 to switch 88 and to first relay coil 84.

In operation of the warning means of this invention, mobile plate 52 is normally not inserted between fixed plates 48 and 50, and conductor elements 68 and 70 are preferably spring-loaded (FIG. 3) to be in electrical and physical contact with one another.

If switch 88 is associated with the hood of an automobile, for example, the switch is normally open when the hood is closed. However, if someone opens the hood without inserting mobile plate 52 between fixed plates 48 and 50, a circuit is completed from battery 10, through line 72, terminal 74, conductor 76, conductor elements 68 and 70, line 78 through terminal 82, relay coil 84 and switch 88 to electrical common or ground.

The energization of first relay coil 84 causes relay plate 80 to be attracted toward the coil so that terminals 89 and 90 contact each other. Simultaneously, relay plate 80 moves away from contact with terminal 82 so that current flows through the relay plate, through contacts 89 and 90 to warning device 94.

The current flowing into the warning device also flows through conductor 96 to second relay coil 98. From here, the current passes through terminal 102, through second relay plate 104 and through conductor 106 to electrical common or ground.

This energization of second relay 100 causes relay plate 104 to be attracted toward second relay coil 98, and terminals 108 and 110 are moved into contacting relationship. This closing of terminals 108 and 110 occurs at substantially the same time that terminals 89 and 90 are opening as a result of the de-energization of first relay 86 by the separation of terminal 82 from first relay plate 80.

Thus, even if switch 88 is opened, the horn or other warning device 94 will continue to be energized because current now flows through terminal 82, relay coil 84, line 112, terminals 110 and 108, through second relay plate 104, and through conductor 106 to ground. First relay 86, therefore, continues to be alternately energized and de-energized even after the hood of the automobile has been closed and switch 88 is opened so that the warning device also continues to be energized to place persons in the vicinity on notice that the vehicle is being tampered with.

In order to de-energize warning device 94 without the use of mobile plate 52, it is necessary to sever line 92; however, this is located in an extremely inaccessible location within the vehicle so that it is very difficult for someone to reach and sever the line. Otherwise, mobile plate 52 must be inserted between fixed plates 48 and 50 so that conductor elements 68 and 70 are electrically separated before the warning device will cease to be energized.

In accordance with one embodiment of this invention, a fourth normally closed switch is provided in circuit with primary winding 12 and includes conductor elements 114 and 116 located in opposed relationship with each other in plates 48 and 50, respectively. Conductor element 114 is coupled via conductor 118 to terminal 58 located in cover 32, and opposed conductor element 116 is connected by line 120 to a first solenoid 122. This solenoid is mechanically coupled to brake means that include a spring 124 coupled to a piston 126 that together act to move brake assembly 128 in a direction determined by the energized condition of solenoid 122.

In operation, the solenoid 122 is normally de-energized and brake assembly 128 is normally in a condition not to cause braking of the vehicle. However, if someone tampering with the vehicle and seeking to energize the ignition system causes terminals 30 and 58 to be electrically connected together, a current flows from battery 10 through terminals 30 and 58, through conductor elements 114 and 116 to solenoid 122. This energizes the solenoid and causes the spring and piston to move brake assembly 128 to brake the vehicle.

Thus, if someone not in possession of mobile plate 52 connects terminals 38 and 50 together to cause electrical current to flow into capacitor 18 and breaker points 16, and even if he somehow obtains high voltage in distributor 26 and spark plugs 28 to start the vehicle's engine, the brakes of the vehicle will be applied to prevent movement thereof.

In accordance with an embodiment of the invention, a fifth normally closed switch is provided in circuit with primary coil 12 and with breaker points 16 to normally ground the primary coil and to prevent current from passing to the breaker points so that the vehicle's engine cannot be started. As here embodied, the fifth switch includes conductor elements 130 and 132 located in fixed plates 48 and 50, respectively, and in opposed relationship with one another. The conductor elements are preferably spring-loaded (FIG. 3), and the elements are normally in physical and electrical contact with each other.

Conductor element 132 is grounded by line 134 and conductor element 130 is coupled via conductor 136 to terminal 64. Thus, in operation if someone not in possession of mobile plate 52 in attempting to energize the ignition system bridges terminals 38 and 58 in cover 32, current still does not reach capacitor 18 and breaker points 16. Rather, the flow of current is directed through terminal 64, conductor 136 and through conductor elements 130 and 132 to ground.

However, when mobile plate 52 is inserted between fixed plates 48 and 50, an insulating area of the mobile plate separates normally closed conductor elements 130 and 132. As a result, the primary coil is no longer shorted to ground through terminal 64 and conductor 136, but rather, the current flows from the primary coil to capacitor 18 and points 16.

In accordance with another preferred embodiment of this invention, a sixth normally open switch is provided in circuit with the primary winding. As here embodied, the sixth switch includes conductor elements 138 and 140 located in opposed relationship in fixed plates 48 and 50.

Conductor element 138 is coupled via conductor 118 to terminal 58, and conductor element 140 is in circuit with second and third solenoids 142 and 144 via line 146. Solenoid 142 is coupled to exhaust blocking means for blocking the engine exhaust of the vehicle to stall the vehicle when the sixth switch is open and the engine is started.

As here embodied, the exhaust blocking means includes connector 148 coupled between solenoid 142 and valve 150 that is located within the exhaust pipe 152 of the vehicle.

In operation, solenoid 122 is normally de-energized and valve 150 is normally closed to block passage of exhaust through pipe 152. Thus, even if the engine is started without the use of mobile plate 52, the engine will stall as a result of the build up of exhaust caused by the blockage of valve 150.

However, when mobile plate 52 is inserted between fixed plates 48 and 50 and with conductor element 154 in electrical contact with conductor elements 138 and 140 a circuit is completed from battery 10 through solenoid 142. Thus, when the mobile plate 52 is inserted into place the valve 150 opens to allow the passage of exhaust through pipe 152 so that the engine of the vehicle will not stall.

Still another embodiment of the invention includes fuel line blocking means coupled to a third solenoid 144 for blocking the flow of fuel to the vehicle's engine when the sixth switch is open to prevent starting of the vehicle's engine. As here embodied, the fuel line blocking means include a spring 156 coupled between solenoid 144 and fuel line stopper 158 located in fuel line 160.

In operation, solenoid 144 is normally de-energized and stopper 158 blocks the flow of fuel through line 160. When mobile plate 52, however, is inserted into place between fixed plates 48 and 50 with conductor 154 in contacting relationship with conductor elements 138 and 140 the solenoid 144 is energized. As a result, stopper 158 is moved to permit the passage of fuel through line 160 and the engine may be started.

Although the multi-contact switch assembly 43 could be formed in a number of ways, the arrangement of two fixed plates and a mobile plate described herein has been found to be most effective for maintaining security of the system.

Figure 3:
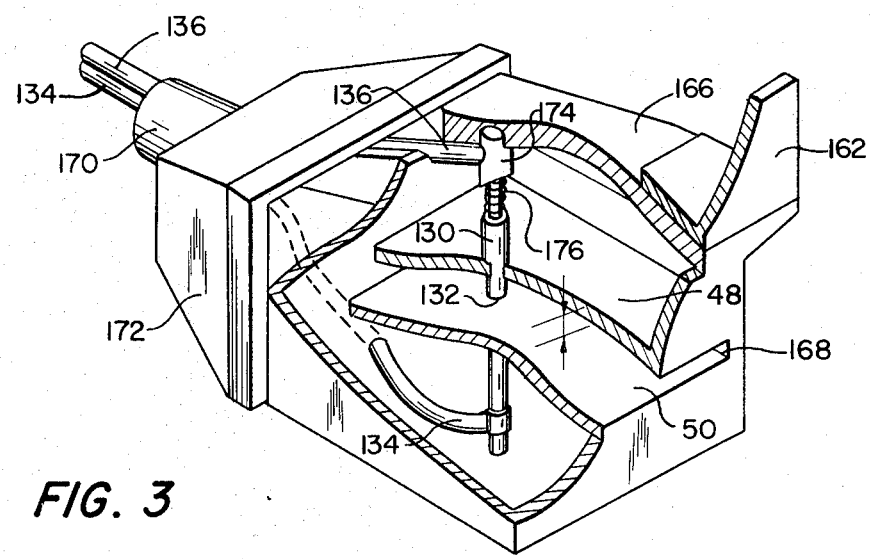
FIG. 3 is a perspective view, partially cut away, of a portion of the multi-contact switch assembly of this invention.
Figure 4:
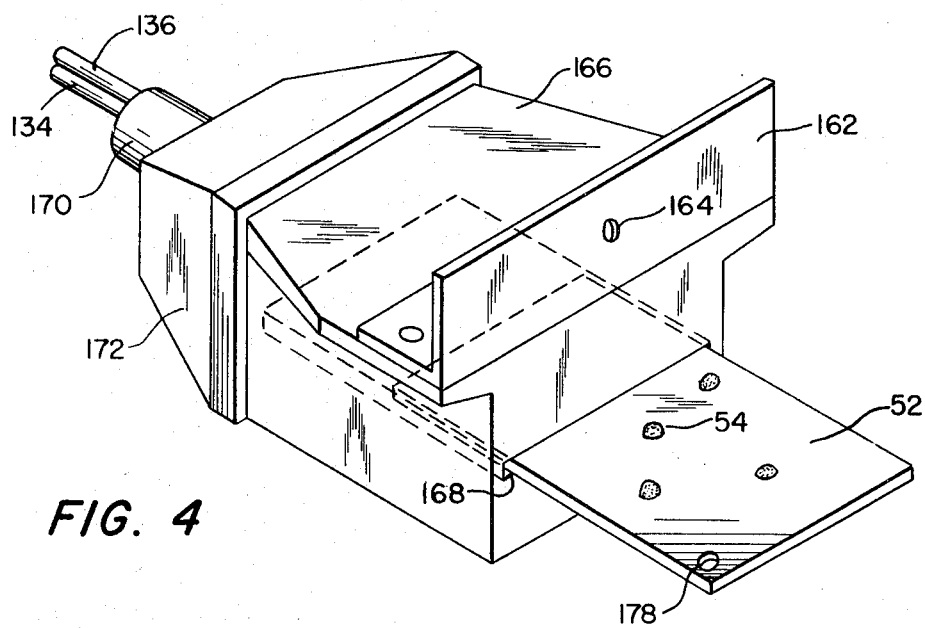
FIG. 4 is a perspective view of the switch assembly illustrating the positioning of the mobile plate in accordance with the invention.

With reference now to FIGS. 3 and 4, there is shown a generally L-shaped plate 162 which is joined to the vehicle by a bolt, for example, (not shown) that passes through hole 164. Plate 162 is also bolted or otherwise fastened to housing 166, and the switch assembly can be mounted to the instrument panel of the vehicle or under the panel in a place not ordinarily visible.

Housing 166 includes a slot 168 for receiving mobile plate 52, and the slot is bounded on one side by fixed plate 48 and on the other side by fixed plate 50.

Each of the conductor elements associated with fixed plates 48 and 50 is connected to a conductor as shown in FIG. 2. The conductors enter the switch assembly through tube 170 and through cover 172. The conductor goes through a guide tube 174, for example, to connect with the respective conductor element 130, for example.

If a conductor element is spring-loaded, a spring 176 engages the conductor element 130, for example, to force the opposed spring-loaded elements to maintain normal physical and electrical contact with each other. In this example conductor element 132 is similarly spring-loaded. Although more than one pair of spring-loaded conductor elements may be used within the switch assembly, only one pair is illustrated in FIG. 3 for the purpose of explanation.

In addition, conductor elements, such as elements 138 and 140 (FIG. 2) are also oriented in the respective plates 48 and 50. These conductor elements may be similar to the spring-loaded elements previously described with the exception that springs may not be included and the conductor elements are rigidly and fixedly located within the respective plates. Alternatively, these conductor elements may also include springs which are merely shorter than the so-called spring-loaded conductor elements already described. In this way, the conductor elements with the longer springs are held in normally contacting relationship while the conductor elements with the shorter springs are normally held in non-contacting relationship with each other as long as the mobile insert 52 is not positioned between the fixed plates.

Mobile plate 52 (FIG. 4) also includes a plurality of conductor elements and includes insulating areas for electrically and physically separating the spring-loaded elements in the fixed plates that are normally contacting. Clearly, the location of the various conductor elements within the fixed plates and the mobile plate can be varied with a wide number of combinations being provided. As a result, a very large variety of positions of the conductor elements can be used for different vehicles so that it would be very difficult to design a master mobile plate to compromise the systems. In addition, an indicator, such as a hole 178, can be located in the mobile plate to indicate to the user the correct position for insertion of the plate into slot 168.

In addition to varying the number and location of the conductor elements within the switch assembly, additional so-called dummy conductor elements may be located within mobile plate 52 in order to hide the true number of conductor elements located within the fixed plates.

Although the preferred material for the construction of fixed plates 48 and 50 and of mobile plate 52 is bakelite, other suitable materials could also be used. Similarly, the housing 166 of the switch assembly is preferably made of a thermosetting resin, but other suitable materials could also be used.

Figure 5:
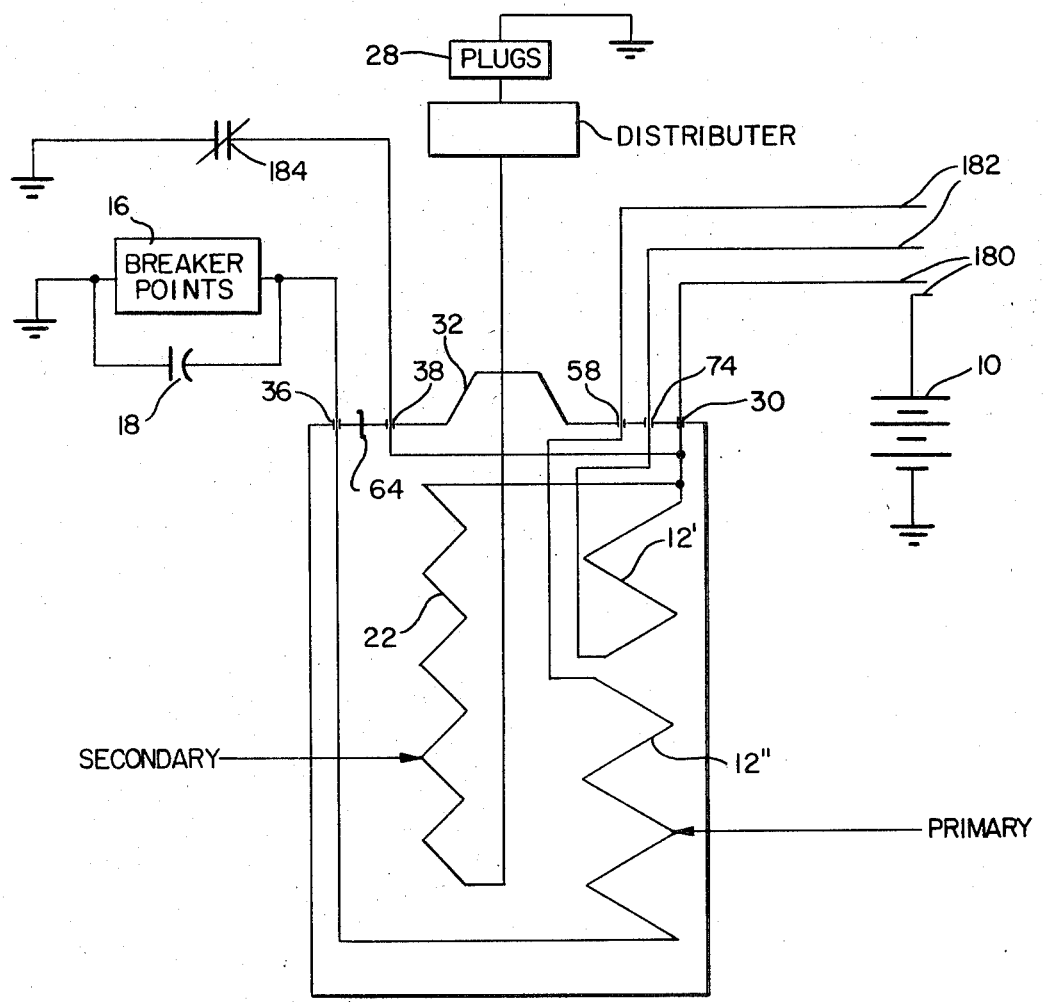
FIG. 5 is a diagrammatic illustration of another preferred embodiment of the invention.

Another preferred embodiment of the invention is illustrated in FIG. 5. Battery 10 is coupled to a normally open switch 180 that is preferably formed by a pair of opposed conductor elements within a switch assembly as illustrated in FIGS. 3 and 4. This switch, in turn, is coupled to a first segment 12' of the primary coil. A second normally open switch 182 is connected to the opposite end of segment 12' and to a second segment 12'' of the primary coil. The opposite end of the second segment is connected through terminal 36 to breaker points 16 and capacitor 18.

A third normally closed switch 184 is coupled to electrical common or ground and is in circuit with terminal 38 and between switch 180 and segment 12' of the primary coil.

Here as in the previously described embodiments, the primary coil is used as the basic security element, and in operation, current to the primary coil is normally blocked by switches 180 and 182. Switch 184 also provides the additional protection of grounding the primary coil under normal conditions. However, when mobile plate 52 is inserted between fixed plates 48 and 50, switches 180 and 182 are closed and switch 184 is opened. As a result, current is permitted to flow through the primary coil and to the breaker points 16 and capacitor 18. This enables the capacitor 18 to charge and discharge with concomitant changes in the electromagnetic field within the core 24 around which the primary and secondary coils are located. As a result, a large induced voltage is produced in the secondary coil to provide the needed electrical energy to the spark plugs.

The present invention, thus, provides for an inexpensive and effective theft-prevention ignition system for vehicles which utilizes both electrical and mechanical arrangements to prevent activation of the ignition system except by persons having the correct mobile plate or insert. This system provides a large number of security features so that it would be almost impossible for someone attempting to compromise the system to understand and overcome each one of these features without first being discovered in the act of tampering with the vehicle.

The invention in its broader aspects is not limited to the specific details shown and described, and departures may be made from such details without departing from the principles of the invention and without sacrificing its chief advantages.

What is claimed is:

1. A theft-prevention ignition system for a vehicle having a D.C. energy source, a primary coil, an ignition switch in circuit with the source and the coil, breaker points connected between the coil and electrical common, a capacitor in parallel circuit with said breaker points, a cam located to make and break the breaker points, a secondary coil electromagnetically coupled with said primary coil and a distributor in circuit with said secondary coil wherein the improvement comprises:

switching means including a first normally open switch in circuit with said primary coil and said breaker points, said first switch being interposed between segments of said primary coil to normally interrupt the circuit continuity of said primary coil to prevent the flow of current to said points and said capacitor upon actuation of the ignition switch when said first switch is open, and a second normally closed switch;

a third normally open switch for sensing tampering with the vehicle;

warning means in circuit with said second and third switches for continuously producing a warning signal when said second switch is closed in the event that said third switch is even momentarily closed whereby the continuous presence of the warning signal will place persons in the vicinity on notice that the vehicle is being tampered with; and actuator means for operating said first and second switches to permit current to flow to said primary coil and breaker points upon closure of said first switch and to disable said warning means upon opening of said second switch.

2. A theft-prevention ignition system as in claim 1 wherein said warning means include:

a first relay in circuit with said second switch and coupled to said third switch to be grounded to electrical common through said third switch when said third switch is closed;

a second relay in circuit with said first relay and in parallel circuit with said third switch for grounding said first relay to common even when said third switch is open; and a warning device in circuit with said first and second relays.

3. A theft-prevention ignition system as in claim 2 wherein said first relay includes terminals in circuit with said second switch and said warning device for enabling the activation of the warning device when said terminals are closed and said second switch is closed.

4. A theft-prevention ignition system as in claim 3, wherein said second relay includes terminals in circuit with said first relay and electrical common to enable the grounding of said first relay to common when said last-mentioned terminals are closed.

5. A theft-prevention ignition system as in claim 4 wherein said first relay terminals are closed during operation of said warning means when said second relay terminals are open.

6. A theft-prevention ignition system as in claim 4, wherein:

said switching means further includes a fourth normally closed switch in circuit with said primary coil and operable by said actuator means; and which includes a first solenoid in circuit with said fourth switch; and brake means coupled to said solenoid for braking the vehicle when said fourth switch is closed and a circuit is completed from said D.C. energy source through said fourth switch as by a thief tampering with the system.

7. A theft-prevention ignition system as in claim 6 wherein said fourth switch is formed by a first fixed electrically insulating plate having conductor elements therein and a second fixed electrically insulating plate having conductor elements therein and in opposed position with said first plate conductor elements; and said actuator means comprises a mobile electrically insulating plate having electrically insulating areas therein with one of said areas therein electrically and physically separating the conductor elements of said fourth switch to open the fourth switch when the mobile plate is selectively inserted between the first and second plates.

8. A theft-prevention system as in claim 4, said switching means further including a fifth normally closed switch in circuit with the primary coil and the breaker points and operable by said actuator means for normally grounding the primary coil to prevent current from passing to said breaker points whereby the vehicle's engine cannot be started.

9. A theft-prevention ignition system as in claim 8 wherein said fifth switch is formed by a first fixed electrically insulating plate having conductor elements therein and a second fixed electrically insulating plate having conductor elements therein and in opposed position with said first plate conductor elements; and said actuator means comprises a mobile electrically insulating plate having electrically insulating areas therein with one of said areas electrically and physically separating the conductor elements of said fifth switch to open the fifth switch when the mobile plate is selectively inserted between said first and second plates.

10. A theft-prevention ignition system as in claim 4, wherein:
    said switching means further includes a sixth normally open switch in circuit with said primary coil and operable by said actuator means; and which includes
    a second solenoid in circuit with said sixth switch; and
    exhaust blocking means coupled to said second solenoid for blocking the engine exhaust of the vehicle to stall the vehicle when said sixth switch is open and the engine is started.

11. A theft-prevention ignition system as in claim 10 wherein said sixth switch is formed by a first fixed electrically insulating plate having conductor elements therein and a second fixed electrically insulating plate having conductor elements therein and in opposed position with said first plate conductor elements; and said actuator means comprises a mobile electrically insulating plate having conductor elements therein with one of said last-mentioned conductor elements located for conductively contacting the opposed elements of said sixth switch to close the sixth switch when said mobile plate is selectively inserted between said first and second plates.

12. A theft-prevention ignition system as in claim 10 further including:
    a third solenoid in circuit with said sixth switch; and
    fuel line blocking means coupled to said third solenoid for blocking the flow of fuel to the vehicle's engine when said sixth switch is open to prevent starting of the vehicle's engine.

13. A theft-prevention ignition system as in claim 1 wherein said first and second switches are formed by a first fixed electrically insulating plate having conductor elements therein; and
    a second fixed electrically insulating plate having conductor elements therein and in opposed position with said first plate conductor elements; and
    said actuator means comprises a mobile electrically insulating plate having conductor elements therein with one of said last-mentioned elements located for conductively contacting the opposed element of said first switch to close the first switch when said mobile plate is selectively inserted between said first and second plates;
    said mobile plate further having electrically insulating areas therein with one of said areas electrically and physically separating the conductor elements of said second switch to open the second switch when the mobile plate is selectively inserted between said first and second plates.

14. A theft-prevention ignition system for vehicles having a D.C. energy source, an ignition switch in circuit with the source and a primary coil, breaker points connected between the coil and electrical common, a capacitor in parallel circuit with said breaker points, a cam located to make and break the breaker points, a secondary coil electro-magnetically coupled with said primary coil and a distributor in circuit with said secondary coil wherein the improvement comprises:
    a first normally open switch in circuit with said energy source and said primary coil for preventing the flow of current from said energy source to said primary coil when the ignition switch is closed;
    a second normally open switch in circuit between segments of said primary coil for interrupting the circuit continuity of said primary coil;
    a third normally closed switch coupled to electrical common and in circuit between said first switch and a segment of said primary coil for preventing electrical current flow through said primary coil when said first switch is closed while the third switch also remains closed; and
    actuator means for operating said first, second, and third switches to permit current to flow through both segments of the primary coil and to the breaker points and capacitor.

* * * * *